(12) United States Patent
Shao et al.

(10) Patent No.: US 12,333,470 B1
(45) Date of Patent: Jun. 17, 2025

(54) METHODS, INTERNET OF THINGS SYSTEMS, AND STORAGE MEDIUMS FOR PREDICTING WATER ACCUMULATION RISKS IN SMART CITIES

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yuefei Wu, Chengdu (CN); Bin Liu, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 225 days.

(21) Appl. No.: 18/051,864

(22) Filed: Nov. 1, 2022

(30) Foreign Application Priority Data

Oct. 19, 2022 (CN) .......................... 202211277579.7

(51) Int. Cl.
| | | |
|---|---|---|
| *G06Q 10/06* | (2023.01) | |
| *G06Q 10/0635* | (2023.01) | |
| *G16Y 20/10* | (2020.01) | |
| *G16Y 40/10* | (2020.01) | |
| *G16Y 10/40* | (2020.01) | |

(52) U.S. Cl.
CPC .......... *G06Q 10/0635* (2013.01); *G16Y 20/10* (2020.01); *G16Y 40/10* (2020.01); *G16Y 10/40* (2020.01)

(58) Field of Classification Search
CPC .......................................... G06Q 10/00–90/00
See application file for complete search history.

(56) References Cited

U.S. PATENT DOCUMENTS

| | | | | |
|---|---|---|---|---|
| 2014/0330749 | A1* | 11/2014 | Candas | G06Q 40/06 705/36 R |
| 2016/0343093 | A1* | 11/2016 | Riland | G06Q 50/06 |
| 2022/0156636 | A1* | 5/2022 | Albrecht | G01C 13/002 |

* cited by examiner

*Primary Examiner* — Arif Ullah
(74) *Attorney, Agent, or Firm* — METIS IP LLC

(57) ABSTRACT

The embodiments of the present disclosure provide a method for predicting a water accumulation risk in a smart city implemented based on a management platform of an Internet of Things (IoT) system for predicting a water accumulation in a smart city. The method may include: predicting, based on obtained area information of a target area, a water accumulation risk in the target area; determining, based on the water accumulation risk, an adjustment scheme corresponding to the target area; and executing an adjustment instruction corresponding to the adjustment scheme.

17 Claims, 7 Drawing Sheets

320

420

METHODS, INTERNET OF THINGS SYSTEMS, AND STORAGE MEDIUMS FOR PREDICTING WATER ACCUMULATION RISKS IN SMART CITIES

CROSS-REFERENCE TO RELATED APPLICATIONS

This application claims priority of Chinese Patent Application No. 202211277579.7, filed on Oct. 19, 2022, the entire contents of which are hereby incorporated by reference.

TECHNICAL FIELD

The present disclosure relates the field of the Internet of Things (IoT) and the cloud platform, and in particular, to a method, an Internet of Things system, and a storage medium for predicting a water accumulation risk in a smart city.

BACKGROUND

In modern life, due to the impact of weather and geological disasters, water accumulation may be usually caused, which may bring huge inconvenience to people's normal life.

Therefore, it is desirable to provide a method for predicting a water accumulation risk in a smart city, which may determine and implement countermeasures by predicting the water accumulation risk, so as to quickly prepare for water accumulation and avoid causing casualties and economic losses.

SUMMARY

One or more embodiments of the present disclosure provide a method for predicting a water accumulation risk in a smart city implemented based on a management platform of an Internet of Things (IoT) system for predicting a water accumulation risk in a smart city. The method may include: predicting, based on obtained area information of a target area, a water accumulation risk in the target area; determining, based on the water accumulation risk, an adjustment scheme corresponding to the target area; and executing an adjustment instruction corresponding to the adjustment scheme.

One or more embodiments of the present disclosure provide an Internet of Things (IoT) system for predicting a water accumulation risk in a smart city. The system may include a management platform, a user platform, a service platform, a sensor network platform, and an object platform. The management platform may include a general database and a plurality of management sub-platforms. The sensor network platform may include a plurality of sensor network sub-platforms. The area information may be obtained based on the object platform, transmitted to a management sub-platform by a sensor network sub-platform corresponding to the management, and uploaded to the general database by the management sub-platform. The management platform is configured to: predict, based on obtained area information of a target area, a water accumulation risk in the target area; determine, based on the water accumulation risk, an adjustment scheme corresponding to the target area; and execute an adjustment instruction corresponding to the adjustment scheme.

One or more embodiments of the present disclosure provide a non-transitory computer-readable storage medium storing computer instructions. When reading the computer instructions in the storage medium, a computer implements the method for predicting a water accumulation risk in a smart city of any of the embodiments.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein:

FIG. 3-1 is a schematic diagram illustrating determining a road water accumulation risk of each road in a target area during a target time period based on a water accumulation risk prediction model according to some embodiments of the present disclosure;

FIG. 3-2 is a schematic diagram illustrating area road network diagram structure data according to some embodiments of the present disclosure;

FIG. 4-1 is a schematic diagram illustrating determining a first joint regulation scheme corresponding to a target area based on a joint scheduling model according to some embodiments of the present disclosure;

FIG. 4-2 is a schematic diagram illustrating structure data of an area road network facility diagram according to some embodiments of the present disclosure.

DETAILED DESCRIPTION

Figure 1:
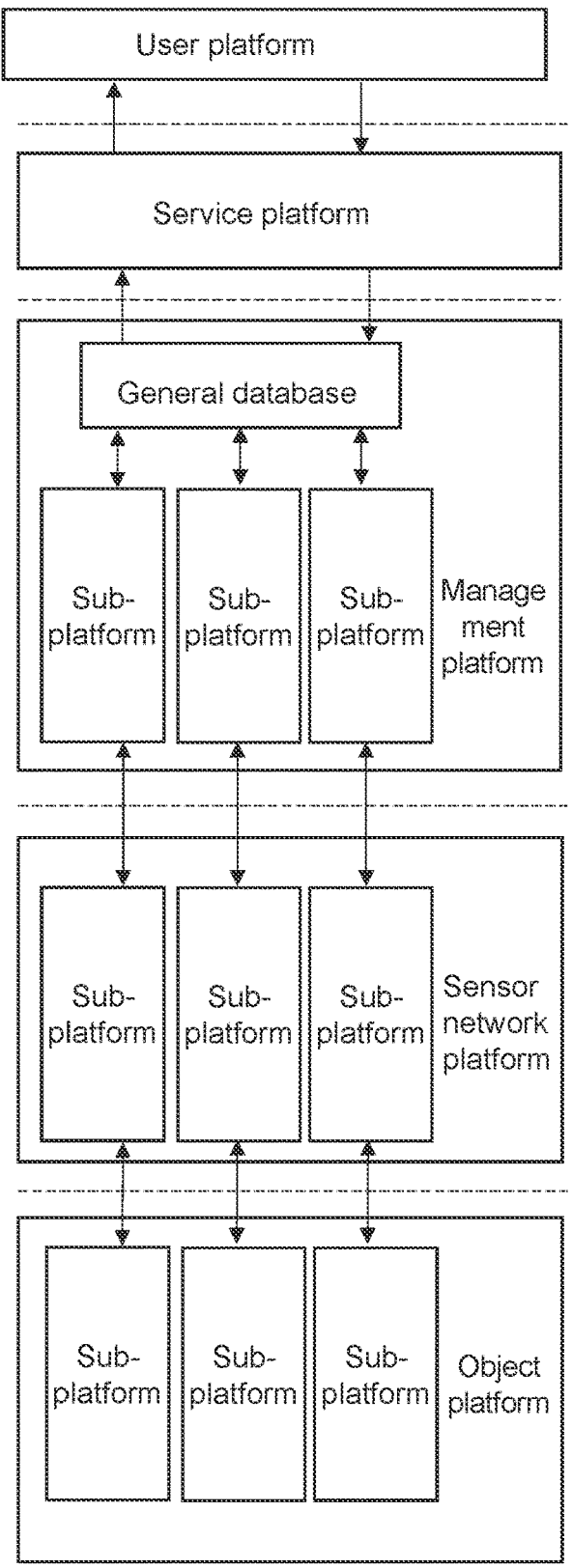
FIG. 1 is a schematic diagram illustrating an exemplary system for predicting a water accumulation risk in a smart city according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary system 100 for predicting a water accumulation risk in a smart city according to some embodiments of the present disclosure.

It should be understood that the system 100 for predicting a water accumulation risk in a smart city may be realized in various ways. As shown in FIG. 1, the system for predicting a water accumulation risk in a smart city may further include a user platform, a service platform, a sensor network platform, and an object platform. In some embodiments, the system for predicting a water accumulation risk in a smart city may be part of or implemented by a processing device.

A user platform may refer to a user-oriented platform, for example, the user platform may obtain an instruction input by a user through a terminal to query the water accumulation risk and an adjustment scheme. As another example, the user platform may feedback the adjustment scheme to the user.

A service platform may refer to a platform that can provide input and output services for the user. For example, the service platform may pass the adjustment scheme to the user platform, etc.

A management platform may refer to overall planning and coordination of connections and collaboration among various functional platforms, and aggregate all information of the system for predicting a water accumulation risk in a smart city. The management platform may provide perception management and control management functions for an operation system of the system for predicting a water accumulation risk in a smart city.

In some embodiments, the management platform may include a general database and a plurality of management sub-platforms. An area may correspond to a management sub-platform. For example, the management sub-platform may upload area information in a corresponding target area obtained through the object platform to the general database of the management platform. The general database of the management platform may predict the water accumulation risk in the target area based on the area information; determine the adjustment scheme corresponding to the target area based on the water accumulation risk; and execute an adjustment instruction corresponding to the adjustment scheme and transmit the adjustment scheme to the user platform through the service platform. In some embodiments, the management platform may be a remote platform controlled by a manager, artificial intelligence, or a preset rule.

The management platform may be configured to obtain the area information through the object platform; predict the water accumulation risk in the target area based on the area information of the target area; determine the adjustment scheme corresponding to the target area based on the water accumulation risk; and execute the adjustment instruction corresponding to the adjustment scheme. For more details about executing the adjustment instruction corresponding to the adjustment scheme, please refer to FIG. 2 and its related description.

In some embodiments, the management platform may be configured to determine the first joint regulation scheme corresponding to the target area based on processing on the area information performed by a joint scheduling model, the joint scheduling model may be a machine learning model. For more descriptions about determining the first joint regulation scheme and the joint scheduling model, please see FIG. 4 and its related descriptions.

In some embodiments, the management platform may be configured to further obtain an initial material scheduling scheme, the initial material scheduling scheme including initial supply of rescue materials supplied by each rescue point to each demand point; obtain at least one candidate material scheduling scheme by iteratively updating the initial material scheduling scheme based on a first preset algorithm; calculating an evaluation value of each candidate material scheduling scheme of the at least one candidate material scheduling scheme based on a second preset algorithm; and designate the candidate material scheduling scheme whose evaluation value satisfies a preset requirement as an initial material scheduling scheme of a next iteration and iterate until an iteration completion condition is satisfied. For more descriptions about determining the material scheduling scheme corresponding to the target area through iterations, please refer to FIG. 5 and its related description.

The sensor network platform may refer to a functional platform for managing sensor communication. In some embodiments, the sensor network platform may be connected with the management platform and the object platform to realize functions of perceptual information sensor communication and control information sensor communication. In some embodiments, the sensor network platform may include a plurality of sensor network sub-platforms. An area may correspond to a sensor network sub-platform and a management sub-platform. For example, the sensor network sub-platform may transmit the area information in the corresponding target area obtained through the object platform to the management sub-platform corresponding to the sensor network sub-platform.

The object platform may refer to a functional platform for generating the perceptual information. In some embodiments, the object platform may obtain information. For example, obtain area information in the target area, etc.

In some embodiments, the system for predicting a water accumulation risk in a smart city may be applied to a plurality of scenarios of water accumulation risk prediction. In some embodiments, the system for predicting a water accumulation risk in a smart city may obtain relevant information (such as road net information, precipitation information, drainage capacity information, historical water accumulation information, etc.) for water accumulation risk prediction in the plurality of scenarios obtained in the target area, so as to obtain water accumulation risks in the plurality of scenarios. In some embodiments, the system for predicting a water accumulation risk in a smart city may obtain the adjustment scheme for dealing with the water accumulation risk in each scenario based on the obtained water accumulation risk in each scenario (for example, the joint scheduling scheme of regulation and storage facilities in the target area, the material scheduling scheme, etc.).

The embodiments of the present disclosure also provide a non-transitory computer-readable storage medium storing computer instructions. When reading the computer instructions in the storage medium, a computer implements a method for predicting a water accumulation risk in a smart city as described in any of the above embodiments.

It should be noted that the above description of the system for predicting a water accumulation risk in a smart city and modules thereof is merely for convenience of description, and is not intended to limit the present disclosure to the scope of the illustrated embodiments. It may be understood that after understanding the principle of the system, those skilled in the art may arbitrarily combine each module or form a sub-system to connect with other modules without departing from this principle. For example, the management platform, the user platform, the service platform, the sensor network platform, and the object platform disclosed in FIG. 1 may be different platforms in a system, or one platform may realize the functions of two or more of the above platforms.

Figure 2:
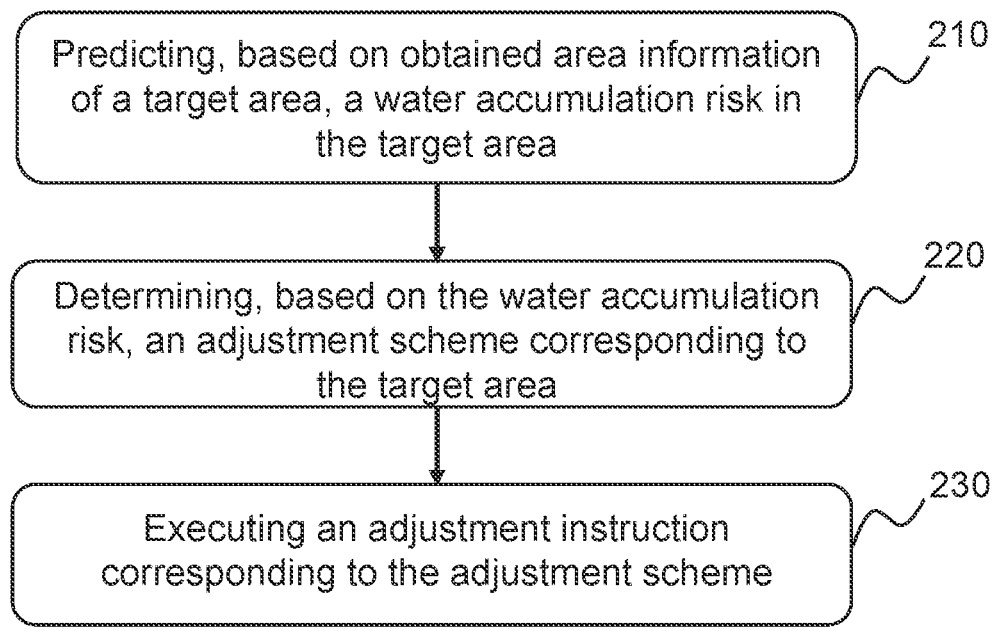
FIG. 2 is a flowchart illustrating an exemplary process for predicting a water accumulation risk in a smart city according to some embodiments of the present disclosure.

FIG. 2 is a flowchart illustrating an exemplary process for predicting a water accumulation risk in a smart city according to some embodiments of the present disclosure. As shown in FIG. 2, the process 200 may include the following operations. In some embodiments, the process 200 may be performed by a management platform.

In 210, the management platform may predict, based on obtained area information of a target area, a water accumulation risk in the target area.

The target area may refer to an area where water accumulation has occurred or may occur. For example, the target area may be a rainfall area suffering from a rainstorm, a surrounding area affected by the rainstorm, an area with water accumulation affected by an upstream flood, a typhoon landing area, a seawater backward area, etc.

The area information may refer to information related to water accumulation prediction that reflects the target area.

In some embodiments, the area information may include road network information, precipitation information, drainage capacity information, historical water accumulation information, etc. in the target area. For more illustration on the above information, please refer to FIG. 3 and its related descriptions.

In some embodiments, the area information may also include deployment information of regulation and storage facilities, water storage capacity information of the regulation and storage facilities, drainage capacity information of the regulation and storage facilities, and on-off information of the regulation and storage facilities in the target area. For more illustration on the above information, please refer to FIG. 4 and its related descriptions.

In some embodiments, the area information may also include division information of a demand point, demand information of a demand point, a water accumulation risk of a demand point, and a priority coefficient of a demand point of the target area, division information of a rescue point, material information of a rescue point, and historical rescue information of a rescue point of the target area. For more illustration on the above information, please refer to FIG. 5 and its related descriptions.

The water accumulation risk may refer to a possibility of water accumulation in the target area. In some embodiments, the water accumulation risk may be characterized as a risk level of water accumulation. The higher the risk level of water accumulation, the greater the possibility of water accumulation in the target area, and the greater the amount of water accumulation. Merely by way of example, the risk level of water accumulation may be determined according to a water accumulation height in the target area. For example, the management platform may preset a water accumulation height threshold. The water accumulation height threshold may include a first water accumulation height threshold and a second water accumulation height threshold. The second water accumulation height threshold may be greater than the first water accumulation height threshold. When the water accumulation height of the target area is smaller than the first water accumulation height threshold, the risk level of water accumulation of the target area may be level 1. When the water accumulation height of the target area is greater than or equal to the first water accumulation height threshold and smaller than the second water accumulation height threshold, the risk level of water accumulation of the target area may be level 2. When the water accumulation height of the target area is greater than the second water accumulation height threshold, the risk level of water accumulation of the target area may be level 3.

In some embodiments, the management platform may analyze and process the area information of the target area by modelling or adopting various data analysis algorithms and determine the water accumulation risk in the target area. Merely by way of example, the management platform may determine, based on historical area information, a historical area information vector corresponding to the historical area information in advance, and generate a water accumulation risk correspondence table based on a historical actual water accumulation risk corresponding to the each historical area information vector. Understandably, the management platform may determine, based on the area information, an area information vector to be predicted corresponding to the area information of this time. Further, the management platform may determine at least one target area information vector in the historical area information vector based on a vector distance (e.g., a Euclidean distance) between the area information vector to be predicted and the historical area information vector. The management platform may take an accumulation risk of the at least one target area information vector as the water accumulation risk.

In some embodiments, the management platform may determine a road water accumulation risk of each road in the target area during a target time period based on processing on the area information performed by a water accumulation risk prediction mode. The water accumulation risk prediction model may be a machine learning model. For more descriptions of the above embodiments, please refer to FIG. 3 and its related descriptions.

In 220, the management platform may determine, based on the water accumulation risk, an adjustment scheme corresponding to the target area.

The adjustment scheme may refer to a mitigation and rescue measure taken to deal with the water accumulation risk. For example, the adjustment scheme may be a joint scheduling drainage system. As another example, the adjustment scheme may be scheduling and optimization of flood control equipment and materials. As yet another example, the adjustment scheme may be underground space flood control.

In some embodiments, the management platform may preset an adjustment scheme corresponding to each type of water accumulation risk. The management platform may determine an adjustment scheme corresponding to the target area based on the predicted corresponding relationship between the water accumulation risk and the adjustment scheme. Merely by way of example, when the water accumulation risk is level 1, the corresponding adjustment scheme may be to turn on the drainage system and the regulation and storage facilities. When the water accumulation risk is level 2, the corresponding adjustment scheme may be to turn on the drainage system and the regulation and storage facilities, and prepare special flood control equipment and rescue materials to solve urban waterlogging. When the risk of accumulating water is level 3, the corresponding adjustment scheme may be to turn on the drainage system and the regulation and storage facilities, prepare special flood control equipment and rescue materials to solve urban waterlogging, evacuate people in the target area and rescue in an underground space, etc.

In some embodiments, in response to the water accumulation risk satisfying a first preset condition, the management platform may determine a first joint regulation scheme corresponding to the target area based on the area information. The first joint regulation scheme may include a joint scheduling scheme of the regulation and storage facilities in the target area. For more descriptions of the above embodiments, please refer to FIG. 4 and its related descriptions.

In some embodiments, in response to the water accumulation risk satisfying a second preset condition, the management platform may determine the material scheduling scheme corresponding to the target area based on the area information. For more descriptions of the above embodiments, please refer to FIG. 5 and its related descriptions.

In 230, the management platform may execute an adjustment instruction corresponding to the adjustment scheme.

The adjustment instruction may refer to an instruction used to realize the adjustment scheme. In some embodiments, one or more adjustment instructions corresponding to an adjustment scheme may be set in advance to form a mapping relationship. For example, when the adjustment scheme is the joint scheduling drainage system, the adjustment instruction may be to turn on the drainage system and the regulation and storage facilities. When the adjustment scheme is the scheduling and optimization of flood control devices and materials, the adjustment instruction may be to assign personnel to prepare flood control equipment and rescue materials. When the adjustment scheme is flood control of the underground space, the adjustment instruction may be to evacuate passengers urgently, inspect infrastructure, and organize an emergency operation, etc.

In some embodiments, the management platform may execute the adjustment instruction by issuing a control instruction. For example, the management platform may issue the control instruction directly to the regulation and storage facilities in the target area to achieve turning on or off of the regulation storage facilities. As another example, the management platform may directly issue the control instruction to a material scheduling system in the target area to achieve scheduling of flood control equipment and rescue materials.

In some embodiments, the management platform may execute the adjustment instruction by issuing prompt information. For example, the management platform may directly send the prompt information to people in the target area through a short message, a text push, an image, a video, a voice message, a broadcast message, etc., so as to realize the emergency evacuation of people in the area. As another example, the management platform may first determine a target terminal of a person or a department that directly executes the adjustment instruction, and send the prompt information to the target terminal through a call or a short message. After receiving the prompt information, a relevant personnel may turn on the drainage system and the regulation and storage facilities, prepare flood control equipment and rescue materials, evacuate passengers, inspect infrastructure, organize an emergency operation, etc.

The method described in some embodiments of the present disclosure may predict the water accumulation risk in the target area through the area information of the target area, so as to determine the corresponding adjustment scheme and execute it, which can deal with the water accumulation risk in advance and quickly, and avoid causing casualties and economic losses.

In some embodiments, the area information may include road network information, precipitation information, drainage capacity information, and historical water accumulation information in the target area.

The road network information may be data related to the road network that describes the target area. For example, the road network information may include relevant information of each intersection (e.g., an intersection position, an altitude, an intersection type, etc.), relevant information of each road (e.g., intersections at both ends of the road, a road width, a road length, a road slope, etc.), etc. in the target area.

The precipitation information may reflect precipitation in the target area during a target time period. For example, the precipitation information may include an amount of precipitation in the target area caused by weather such as rain, snow, hail, etc. during the target time period.

The drainage capacity information may refer to a discharge capacity of liquid accumulated water on the ground of the target area. For example, the drainage capacity information may include a maximum amount of accumulated water that can be discharged in the target area per unit time, such as 10,000 cubic meters per hour and 300,000 cubic meters per day. In some embodiments, the drainage capacity information may be related to the on-off operation information of the regulation and storage facilities to which the accumulated water flows from the target area. For example, when the regulation and storage facilities used in the target area flood are turned on, the drainage capacity of the target area may be enhanced. For more descriptions about the on-off operation information of the facilities, please refer to FIG. 4 of the present disclosure and its related description.

The historical water accumulation information may refer to water accumulation of the target area during a historical time period. In some embodiments, the historical water accumulation information may be represented by a height of water accumulation, such as 0.7 meters, 1.5 meters, etc. In some embodiments, the historical accumulation water information may also reflect a congestion-prone degree at each intersection in the target area. For example, if a certain intersection has accumulated water many times and frequently in history, the congestion-prone degree at the intersection may be relatively high.

In some embodiments, the management platform may determine, based on processing on the area information performed by the water accumulation risk prediction model, the road water accumulation risk of each road in the target area during a target time period. The water accumulation risk prediction model may be a machine learning model.

The target time period may be a time period in which the water accumulation risk needs to be predicted. The target time period may be a time period including any length of time period in the past, present or future. For example, 12 hours in the future, a week in the future, etc.

In some embodiments, the target time period may include at least part of a duration of precipitation weather in the target area. For example, the target time period may be a time period from a beginning to an end of a rainstorm. The rainstorm may be a current rainstorm in the target area. In some embodiments, the target time period may include a plurality of preset sub-time periods. For example, the target time period may include a first hour, a second hour, . . . , a nth hour, etc. of the rainstorm.

In some embodiments, the target time period may be determined according to precipitation and actual needs. For example, when a user predicts that the current rainstorm may cause water accumulation in the target area, the target time period may start when a rainfall speed of the rainstorm is greater than the drainage capacity of the target area and end at a preset time or an estimated end time of the rainstorm. As another example, when the user counts the water accumulation in the target area due to snowfall, the target time period may start when the snow does not naturally melt and end when the snow naturally melts.

The road water accumulation risk may be used to describe a possibility of water accumulation in each road in the target area during a target time period. In some embodiments, the road water accumulation risk may be characterized as a risk level of road water accumulation. Similar to the aforementioned water accumulation risk, the higher the risk level of road water accumulation, the greater the road water accumulation risk and the greater the amount of water accumulation.

Figures 1, 3:
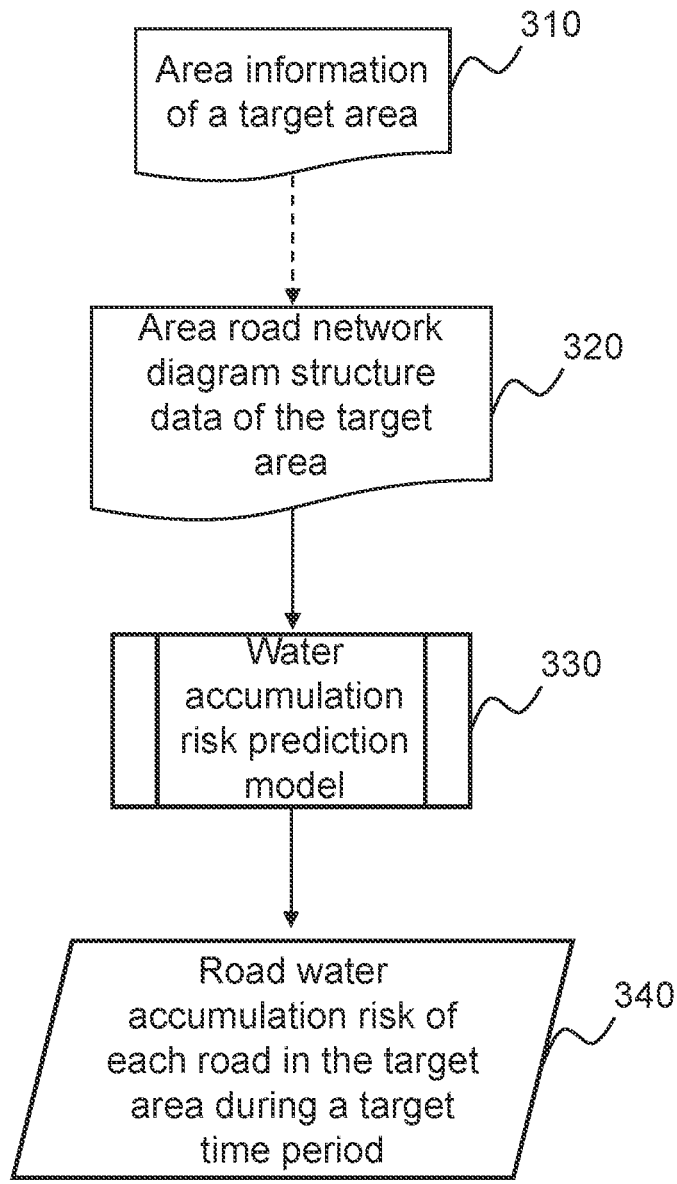
Figures 2, 3:
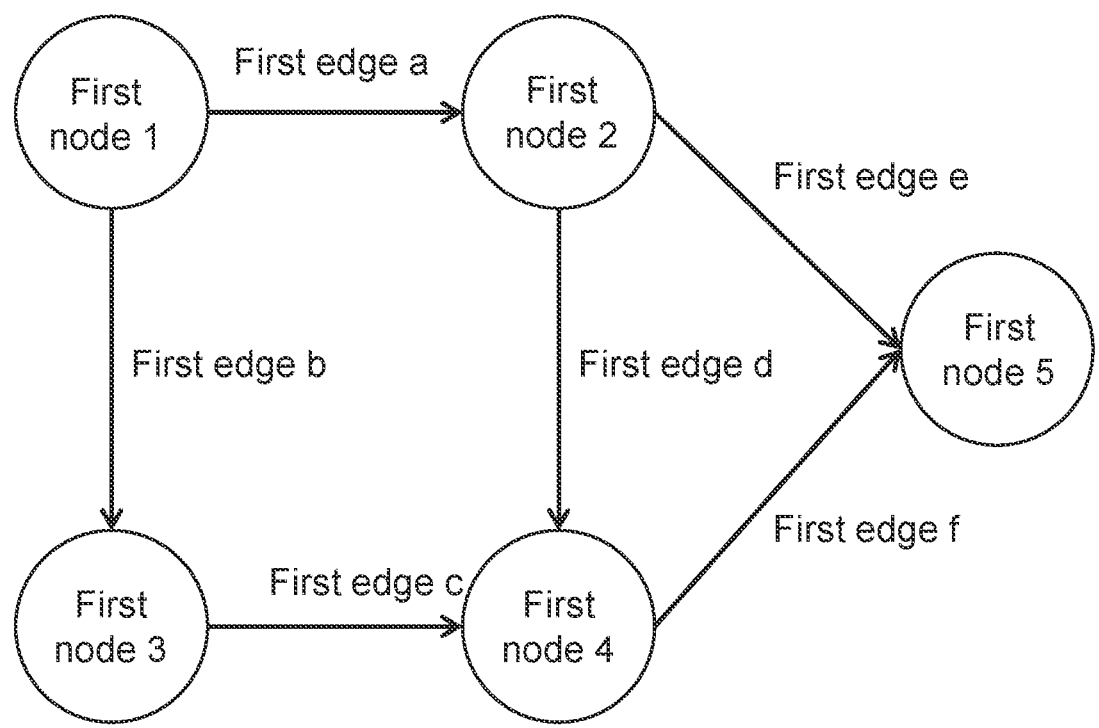

FIG. 3-1 is a schematic diagram illustrating determining a road water accumulation risk of each road in a target area during a target time period based on a water accumulation risk prediction model according to some embodiments of the present disclosure. As shown in FIG. 3-1, the water accumulation risk prediction model 330 may be used to determine the road water accumulation risk 340 of each road in the target area during the target time period. The water accumulation risk prediction model 330 may be a machine learning model.

In some embodiments, an input of the water accumulation risk prediction model 330 may be the area information 310 of the target area. An output of the water accumulation risk prediction model 330 may be the road water accumulation risk 340 of each road in the target area during the target time period. In some embodiments, the water accumulation risk prediction model 330 may be a long-short term memory artificial neural network, a graph neural network model, etc.

The water accumulation risk prediction model 330 may be obtained through training. The training data may be area information of a sample area during a first sample time period. A label may be an actual road water accumulation risk of each road in the sample area during a second sample time period. The first sample time period may be earlier than the second sample time period. A plurality of training samples may be input into an initial water accumulation risk prediction model. A loss function may be constructed based on an output and the label of the initial water accumulation risk prediction model. Parameters of the initial water accumulation risk prediction model may be iteratively updated based on the loss function. When the trained model satisfies a preset condition, the training is finished, and the trained initial water accumulation risk prediction model 330 may be obtained. The preset condition may include, but is not limited to, that the loss function converges, a value of the loss function is smaller than a preset value, or a count of training iterations reaching a threshold, etc.

In some embodiments, the management platform may determine area road network diagram structure data 320 of the target area based on the area information 310 of the target area, process the area road network diagram structure data 320 based on the water accumulation risk prediction model 330, and determine the road water accumulation risk 340 of each road in the target area during the target time period.

FIG. 3-2 is a schematic diagram illustrating area road network diagram structure data according to some embodiments of the present disclosure. The area road network diagram structure data 320 may be a data structure composed of nodes and edges. The edges may connect the nodes, and the nodes and the edges may have attributes.

In some embodiments, the node may correspond to each intersection in the target area. As shown in FIG. 3-2, first nodes 1, 2, 3, 4, and 5 in the area road network diagram structure data 320 may correspond to five actual intersections one by one. The node attribute may reflect a relevant feature of a corresponding intersection. In some embodiments, the node attribute may include a first precipitation feature, a first drainage feature and a congestion-prone feature of the corresponding intersection.

The first drainage feature may describe a drainage capacity of each intersection in the target area. The first drainage feature may be expressed quantitatively by a numerical value, for example, a volume of drainage at an intersection per unit time (e.g., 1000 cubic meters per hour).

The first precipitation feature may describe an amount of precipitation of each intersection in the target area during a target time period. In some embodiments, the first precipitation feature may be determined according to precipitation information. In some embodiments, the first precipitation feature may also include a current existing height of water accumulation of each intersection in the target area, such as 50 cm.

The congestion-prone feature may describe the degree of congestion of each intersection in the target area. In some embodiments, the congestion-prone degree may be determined according to historical water accumulated information of an intersection. For example, if a certain intersection has accumulated water many times and frequently in history, the degree of congestion at the intersection may be relatively high.

In some embodiments, the edge may correspond to each road in the target area.

The edge in the area road network diagram structure data 320 may be a directed edge. The direction of the edge may be determined according to an altitude difference. For example, the direction of the edge may be a direction from high altitude to low altitude. As shown in FIG. 3-2, first sides a, b, c, d, e, and f in the area road network diagram structure data 320 may represent roads between five actual intersections. Among nodes corresponding to two intersections connected by a road, the edge may point from a node corresponding to an intersection with a higher altitude to a node corresponding to an intersection with a lower altitude. For example, according to the first edge a, the altitude of the first node 1 may be higher than that of the first node 2.

The edge attribute may reflect a relevant feature of a corresponding road. In some embodiments, the edge attribute may include a second precipitation feature of the corresponding road, a second drainage feature, a slope, a length, etc.

The second drainage feature may describe the drainage capacity of each road in the target area. The second drainage feature may be expressed quantitatively by a numerical value, for example, a volume of road drainage per unit time (e.g., 2000 cubic meters per hour).

The second precipitation feature may describe an amount of precipitation of each road in the target area during a target time period. In some embodiments, the second precipitation feature may be determined according to the precipitation information. In some embodiments, the second precipitation feature may also include a current existing height of water accumulation of each intersection in the target area, such as 50 cm.

The slope may describe steepness of a road corresponding to the directed edge. The slope may be represented by a slope angle, such as 20°. The length may describe a length of a road between two intersections, for example, 3 km.

As shown in FIG. 3-1, the water accumulation risk prediction model 330 may process the areal road network diagram structure data 320 to determine the road water accumulation risk 340 of each road in the target area during the target time period.

In some embodiments, the water accumulation risk prediction model 330 may be a graph neural network (GNN) model. An input of the water accumulation risk prediction model 330 may be the areal road network diagram structure data 320 of the target area. An output of the water accumulation risk prediction model 330 may be the road water accumulation risk 340 of each road in the target area during the target time period. The edge of the graph neural network model may output the road water accumulation risk of the corresponding road during the target time period. For example, the road water accumulation risk of each road may be represented as a water accumulation risk vector output by each edge. The water accumulation risk vector may include one or more elements. When a plurality of elements are included, the elements at each position may correspond to different road water accumulation risk levels, and an element value may represent a probability of being in the road water accumulation risk level. For example, if the water accumulation risk vector output by a certain edge is (0.8), it may mean that the probability of water accumulation disaster on the road corresponding to the edge is 80%. A management platform may preset that if the water accumulation depth of the road exceeds a preset depth value (such as 60 cm), it is considered that a water accumulation disaster has occurred. As another example, if the water accumulation risk vector output by a certain edge is (0.6, 0.2), it may mean that the probability of level 1 water accumulation on the road is 60%, and the probability of level 2 water accumulation is 20%. The higher the level, the greater the depth of road water accumulation. In some embodiments, the management platform may preset a risk threshold. If a probability value of water accumulation disaster or a probability of water accumulation risk with a corresponding level output by a certain road exceeds the preset risk threshold, the road may be considered as a water accumulation risk section.

In some embodiments, the management platform may train the initial water risk prediction model based on training data to determine the water accumulation risk prediction model 330. The training data may include training samples and training labels. The training samples may be historical area road network diagram structure data determined based on historical data. The training labels may be determined based on the historical road water accumulation. For example, if the historical water accumulation height of a road exceeds the preset depth value, a label value of the node may be 1. If the historical water accumulation height is lower than the preset depth value, a label value of the node may be between 0 and 1, and the closer the historical water accumulation height is to the preset depth value, the closer the label value of the node is to 1. The training samples with the labels may be input into the initial water accumulation risk prediction model, and parameters of the initial water accumulation risk prediction model may be updated through training. When the trained model satisfies a preset condition, the training may be finished, and the trained water accumulation risk prediction model 330 may be obtained.

In some embodiments, the nodes and edges of the historical area road network diagram structure data may be the same as or similar to the area road network diagram structure data to be predicted. The specific attributes of the nodes and edges may be determined based on road network information, historical precipitation information, historical drainage capacity information, and historical water accumulation information.

According to the method described in some embodiments of the present disclosure, the area road network diagram structure data may be processed by the water accumulation risk prediction model, combined with the actual situation of the flow of the water accumulation at each intersection and road, thereby further improving the prediction accuracy of road water accumulation risk.

According to the method described in some embodiments of the present disclosure, the road water accumulation risk may be effectively predicted by the water accumulation risk prediction model, so that the area water accumulation risk can be determined more quickly and accurately, and the subsequent adjustment scheme can be determined as soon as possible to deal with the water accumulation risk in advance.

In some embodiments, the area information may include first information and second information of the target area.

In some embodiments, the first information may include road network information, precipitation information, drainage capacity information, and historical water accumulation information of the target area. For the relevant illustrations of the road network information, precipitation information, drainage capacity information, and historical water accumulation information, please refer to FIG. 3 and corresponding descriptions thereof, which will not be repeated here.

In some embodiments, the second information may include deployment information of regulation and storage facilities, water storage capacity information of the regulation and storage facilities, drainage capacity information of the regulation and storage facilities, and on-off information of the regulation and storage facilities in the target area.

The regulation and storage facilities may refer to facilities that can receive, store and discharge precipitation, road water accumulation and flood, such as a rainwater regulation and storage reservoir, a midway pumping station, a river, a lake, etc. The deployment information of the regulation and storage facilities may include types, deployment positions, and a count of regulation and storage facilities.

The water storage capacity information of the facilities may include a maximum water storage capacity or a current available water storage capacity of the regulation and storage facilities.

The drainage capacity information of the facilities may refer to a maximum drainage speed information of the regulation and storage facilities. In some embodiments, the drainage capacity information of the facilities may be characterized by a volume of water that can be discharged per unit time.

The on-off information of the facilities may refer to on-off state information of an inlet gate and an outlet gate of the regulation and storage facilities. The on-off state information may reflect an operation state of the regulation and storage facilities. The operation state of the regulation and storage facilities may include turning off, water storage, water drainage, and simultaneous water intake and drainage. For example, if the inlet gate of the regulation and storage facilities is closed and the outlet gate is open, then the on-off information of the facilities may be "the inlet gate is closed and the outlet gate is open." Accordingly, the operation state of the regulation and storage facilities may be drainage. As another example, if the inlet gate of the regulation and storage facilities is open and the outlet gate is also open, the on-off information of the facilities may be "the inlet gate is open and the outlet gate is open." Accordingly, the operation state of the regulation and storage facilities may be simultaneous water intake and drainage.

In some embodiments, in response to the water accumulation risk satisfying a first preset condition, the management platform may determine, based on the area information, a joint regulation scheme corresponding to the target area.

The first preset condition may refer to a condition that is satisfied by water accumulation risks of all roads or intersections in the target area. For example, the first preset condition may be that a sum of water accumulation risks of all roads or intersections in the target area exceeds a first water accumulation risk threshold. The first water accumulation risk threshold may be manually preset.

The first joint regulation scheme may refer to a scheme of storing or draining rainfall water accumulation and flood in the target area by controlling the on-off state of the regulation and storage facilities in the target area.

In some embodiments, the first joint regulation scheme may include a joint scheduling scheme of the regulation and storage facilities in the target area. The joint regulation scheme of the regulation and storage facilities may refer to a scheme that controls the on-off state of all the regulation and storage facilities in the target area. An operation state of the regulation and storage facilities may include the on-off state, a current drainage flow, etc. of the regulation and storage facilities. For example, content of the first joint regulation scheme may be "the regulation and storage facility 1 is in a drainage state, and the drainage flow is set to 8 m$^3$/h; the regulation and storage facility 2 is in a closing state; and the regulation and storage facility 3 is in a drainage state, and the drainage flow is set to 10 m$^3$/h . . . ".

In some embodiments, the management platform may find a historical regulation scheme corresponding to historical first information that is most similar to current first information as a first joint regulation scheme currently used.

Figures 1, 4:
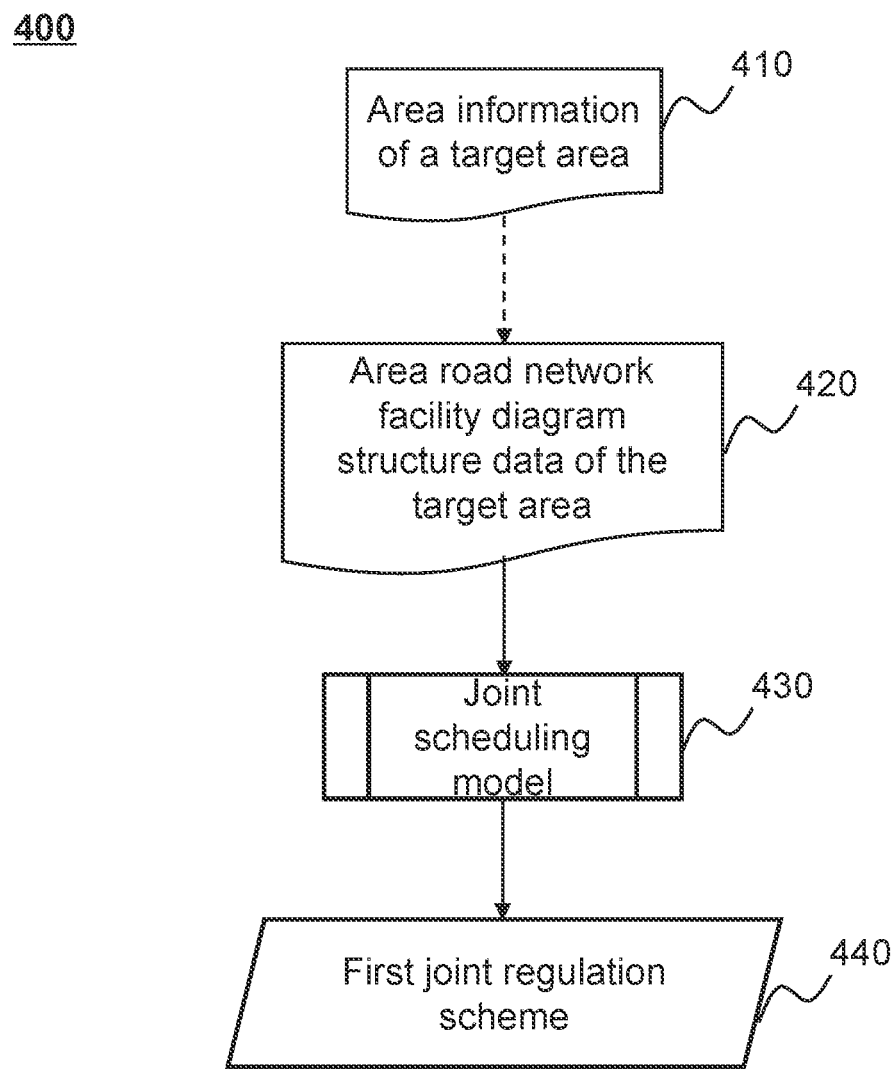
Figures 2, 4:
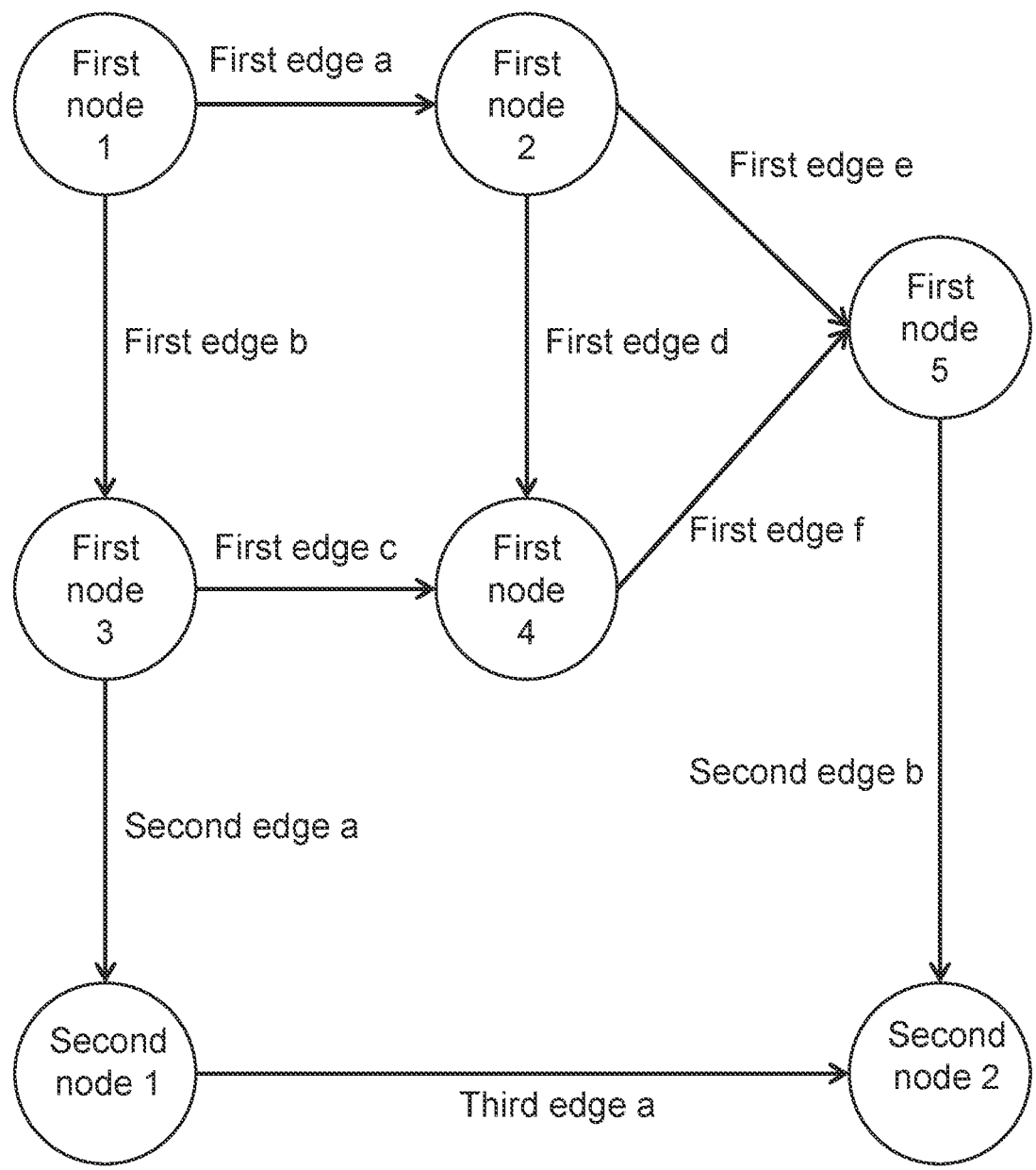

FIG. 4-1 is a schematic diagram illustrating determining a first joint regulation scheme corresponding to a target area based on a joint scheduling model according to some embodiments of the present disclosure. In some embodiments, the joint scheduling model 430 may be executed by a management platform.

In some embodiments, the management platform may determine the first joint regulation scheme corresponding to the target area based on processing on area information performed by the joint scheduling model. The joint scheduling model may be a machine learning model.

In some embodiments, an input of the joint scheduling model may be the area information of the target area. An output may be an on-off state of each regulation and storage facility in the first joint regulation scheme.

In some embodiments, the joint scheduling model may be trained by a plurality of labeled training samples. For example, the management platform may input a plurality of training samples with a label into an initial joint scheduling model, a loss function may be constructed by the labels and a result of the initial joint scheduling model, and parameters of the initial joint scheduling model may be iteratively updated based on the loss function. When the loss function of the initial joint scheduling model satisfies a preset condition, training of the model may be completed, and a trained joint scheduling model may be obtained. The preset condition may be that the loss function converges, a count of iterations reaches a threshold, etc.

In some embodiments, the training samples may be historical area information of a historical target area, and the label may be a historical joint regulation scheme corresponding to the historical area information.

In some embodiments, the management platform may determine structure data of an area road network facility diagram of the target area based on the area information of the target area, process the structure data of the area road network facility diagram based on the joint scheduling model, and determine the first joint regulation scheme corresponding to the target area.

In some embodiments, as shown in FIG. 4-1, the joint scheduling model 430 may determine the first joint regulation scheme 440 based on the structure data 420 of the area road network facility diagram of the target area determined by the area information 410 of the target area.

FIG. 4-2 is a schematic diagram illustrating structure data of an area road network facility diagram according to some embodiments of the present disclosure. In some embodiments, the structure data 420 of the area road network facility diagram may be generated by a management platform based on area information of a target area.

In some embodiments, the structure data of the area road network facility diagram may be a data structure composed of nodes and edges. The edges may connect the nodes, and the nodes and the edges may have attributes.

In some embodiments, the nodes of the structure data of the area road network facility diagram may include first nodes and second nodes. The first nodes may be intersection nodes. The second nodes may be regulation and storage facility nodes. For example, as shown in FIG. 4-2, the structure data 420 of the area road network facility diagram may include a first node 1, a first node 2, a first node 3, a first node 4, a first node 5, a second node 1, and a second node 2.

In some embodiments, the first nodes may correspond to intersections in the target area. The attributes of the first nodes may reflect relevant features of the intersections. For example, the attributes of the first nodes may include precipitation information, drainage capacity information, and historical water accumulation information at the intersections.

In some embodiments, the second nodes may correspond to regulation and storage facilities in the target area. The attributes of the second nodes may reflect relevant features of the regulation and storage facilities. For example, the attributes of the second nodes may include position information, water storage capacity information, water drainage capacity information, and on-off information, etc. of the regulation and storage facilities.

In some embodiments, the edges of the facility diagram structure data may include a first edge, a second edge, and a third edge. The first edge may be a unidirectional edge where the first node with a higher altitude points to the first node with a lower altitude. Further, the first edge may correspond to a road between intersections corresponding to the first nodes.

The second edge may connect the first node and the second node based on a relationship that the intersection corresponding to the first node is directly connected with the regulation and storage facility corresponding to the second node through a drainage pipeline. The second edge may be a unidirectional edge where the first node points to the second node. Further, the second edge may correspond to a drainage pipeline between the intersection corresponding to the first node and the regulation and storage facility corresponding to the second node.

The third edge may connect the second node based on a water flow direction between the regulation and storage facility corresponding to the second node. The third edge may be a unidirectional edge where the second node corresponding to the regulation and storage facility through which the water flows first may point to the second node corresponding to the regulation and storage facility through which the water flows later. Furthermore, the third edge may correspond to a drainage pipeline, a ditch, or a river channel between the regulation and storage facilities corresponding to the second nodes.

For example, as shown in FIG. 4-2, the structure data 420 of the area road network facility diagram may include a first edge a, a first edge b, a first edge c, a first edge d, a first edge e, a first edge f, a second edge a, a second edge b, and a third edge a.

In some embodiments, the edge attributes of the first edge may include precipitation information, drainage capacity information, historical water accumulation information, slope information, and length information of a corresponding road. The slope information may refer to an inclination degree of the corresponding road, which may be characterized by an inclination angle. The length information may refer to a length of the corresponding road. The attributes of the second edge may include drainage capacity information and length information of a corresponding pipeline. The attributes of the third edge may include drainage capacity information and length information of a corresponding pipeline. If the third edge corresponds to a ditch or a river channel, the attributes of the third edge may also include information such as a water flow speed, a water surface width, a water depth, etc. of the ditch or the river channel.

In some embodiments, the joint scheduling model may be a graph neural network (GNN) model. An input of the joint scheduling model may be the structure data of the area road network facility diagram, and an output may be the first joint regulation scheme corresponding to the target area. The node in the GNN may output the on-off state information of the corresponding regulation and storage facility.

The joint scheduling model may be trained based on training data. The training data may include training samples and labels. For example, the training sample may be a historical diagram determined based on the historical data. Nodes and attributes thereof, edges and attribute thereof of the historical diagram may be similar to the structure data of the area road network facility diagram. The label may be on-off state information of historical regulation and storage facilities.

As the input of the joint scheduling model, the structure data of the area road network facility diagram described in some embodiments of the present disclosure may make planning of the on-off state of each regulation and storage facility refer to information of relevant intersections, roads, regulation and storage devices, etc., so that the on-off closing state of each regulation and storage facility in the first joint regulation scheme more suitable for the requirements of drainage operation in the target area.

The joint scheduling model described in some embodiments of the present disclosure may analyze and obtain the first joint regulation scheme of the target area by taking the area information of the target area as input, so that the planned scheme more suitable for the requirements of the drainage operation in the target area.

The method for determining the first joint regulation scheme of the target area based on the area information described in some embodiments of the present disclosure can effectively reduce the labor cost and time cost of manually planning the regulation scheme, and enhance the adaptability of the scheme to an actual drainage demand at the same time.

In some embodiments, the area information may also include third information and fourth information.

The third information may include division information of a demand point, demand information of a demand point, a water accumulation risk of a demand point, and a priority coefficient of a demand point of the target area. The demand point may be a road or an intersection satisfying a second preset condition in the target area. The second preset condition may mean that the water accumulation risk of at least one road section or intersection in the target area still exceeds a second threshold after being regulated by the first joint regulation scheme. The second threshold may be manually preset.

In some embodiments, the water accumulation risk may refer to the water accumulation risk of each road or intersection re-obtained after the first joint regulation scheme is implemented. A method for re-obtaining the water accumulation risk may be the same as that described in FIG. 2.

The division information of the demand point may include serial number information, position information of the demand point, and a corresponding relationship between the demand point and the rescue point. The corresponding relationship may refer to that a corresponding rescue point supplies rescue materials when the demand point needs rescue materials. The relevant illustrations of the rescue point may be found in subsequent descriptions. For example, content of the division information of a demand point may be "demand point 1, the position of which is the intersection of a certain road and another certain road, and the corresponding rescue point is rescue point 4."

The demand information of the demand point may include a serial number of the demand point, types of rescue materials needed, and a quantity required for each type of rescue materials. For example, content of demand information of a certain demand point may be "demand point 1, 20 kg of emergency food, 10 life jackets."

The water accumulation risk of the demand point may refer to a water accumulation risk on the road or intersection corresponding to the demand point.

The priority coefficient of the demand point may refer to the priority of the demand point to obtain rescue materials when the rescue point supplies the rescue materials. The larger the priority coefficient, the higher the priority of the demand point to obtain the rescue materials. For example, content of priority coefficient of a demand point may be "demand point 1, priority coefficient 0.3," "demand point 2, priority coefficient 0.8," "demand point 3, priority coefficient 0.1," etc. In some embodiments, the priority coefficient may be determined based on types of public places near the demand point. Each public place may correspond to a priority coefficient value, and the priority coefficient of the demand point may be a sum of the priority coefficient values of all nearby public places. The priority coefficient value corresponding to each public place may be preset, such as 0.4 for a hospital, 0.5 for a school, 0.2 for a shopping mall, etc.

The fourth information may include division information of a rescue point, material information of a rescue point, and historical rescue information of a rescue point of the target area. The rescue point may refer to a place where rescue materials are stored in the target area and can be supplied to demand points when necessary.

The division information of the rescue point may include serial number information and position information of the rescue point, and a corresponding relationship between the demand point and the rescue point. The corresponding relationship may refer to that a corresponding rescue point supplies rescue materials when the demand point needs rescue materials. For example, content of the division information of a rescue point may be "rescue point 1, the position of which is No. 1, a certain road, and the corresponding demand point includes demand point 2 and a demand point 5."

The material information of the rescue point may include types of rescue materials stored at the rescue point and a quantity of each type of rescue materials. For example, the material information of a rescue point may be "100 kg of emergency food, 200 life jackets, 5 lifeboats, and 5 oxygen tanks."

The historical rescue information of the rescue point may refer to historical record information of the type and quantity of rescue materials supplied by the demand point. For example, the historical rescue information of a certain rescue point may be "on a certain day in a certain year, 10 kg of emergency food is supplied to demand point 1; on a certain day in a certain year, 20 kg of emergency food was supplied to demand point 3; and on a certain day in a certain year, 30 life jackets are supplied to demand point 2."

In some embodiments, the management platform may determine a material scheduling scheme corresponding to the target area based on the area information in response to a water accumulation risk of at least one road section or intersection in the target area satisfying the second preset condition.

The material scheduling scheme may refer to a scheme that the rescue points in the target area supply the types and quantities of rescue materials to the demand points. For example, content of the material scheduling scheme may be "rescue point 1 supplies 10 kg of emergency food and 20 life jackets to the demand point 1 and supplies 3 lifeboats to the rescue point 2; rescue point 2 supplies 20 life clothes to demand points 1 and supplies 20 kg of emergency food to rescue point 3; and rescue point 3 supplies 30 life jackets, 15 kg of emergency food, and 3 lifeboats to demand point 4 and supplies 5 kg of emergency food to rescue point 1."

In some embodiments, the management platform may determine the material scheduling scheme corresponding to the target area through a machine learning model based on the area information of the target area. An input of the machine learning model may be the area information in the target area, and an output may be the material scheduling scheme corresponding to the target area.

Figure 5:
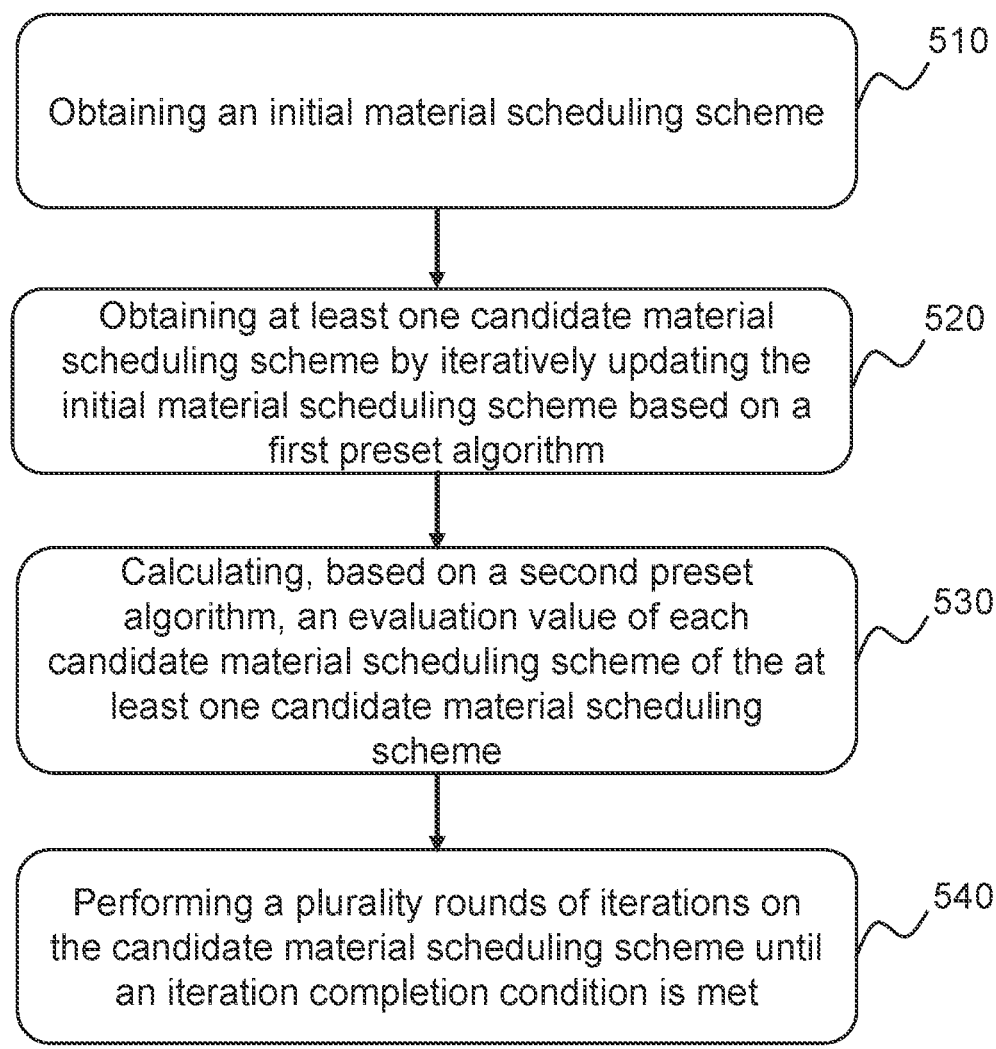
FIG. 5 is a flowchart illustrating an exemplary process for determining a material scheduling scheme corresponding to a target area according to some embodiments of the present disclosure.

FIG. 5 is a flowchart illustrating an exemplary process for determining a material scheduling scheme corresponding to a target area according to some embodiments of the present disclosure. As shown in FIG. 5, the process 500 for determining the material scheduling scheme corresponding to the target area may include the following operations. The process 500 may be executed by a management platform.

In 510, the management platform may obtain an initial material scheduling scheme. The initial material scheduling scheme may include initial supply of rescue materials supplied by each rescue point to each demand point. A count of the initial material scheduling schemes may be one or more. Content of the initial material scheduling scheme may include a system default value, an empirical value, an artificial preset value, or the like, or any combination thereof, set according to an actual demand.

In some embodiments, the initial material scheduling scheme may be characterized by initializing a vector. An exemplary process for initializing the vector corresponding to the initial material scheduling scheme may be as follows. For a plurality of demand points (assuming a count of demand points is J, and J is a positive integer) and a plurality of rescue points (assuming a count of rescue points is I, and I is a positive integer), the management platform may set a count of the initial material scheduling schemes to be n (n is a positive integer) and a vector $X_n^0$ corresponding to the $n^{th}$ initial material scheduling scheme may be expressed as:

$$X_n^0 = (X_{n111}^0, X_{n112}^0, \ldots, X_{n11M}^0, X_{n121}^0, X_{n122}^0, \ldots, X_{nn1JM}^0, X_{n211}^0, X_{n212}^0, \ldots, X_{n21M}^0, X_{n221}^0, X_{n222}^0, \ldots, X_{n2JM}^0, \ldots, X_{n1JM}^0)$$

Vectors $(X_1^0, X_2^0, \ldots, X_N^0)$ corresponding to N initial candidate material scheduling schemes may be expressed as:

$$((X_{1111}^0, X_{1112}^0, \ldots, X_{111M}^0, X_{1121}^0, X_{1122}^0, \ldots X_{11JM}^0, X_{1211}^0, X_{1212}^0, \ldots, X_{121M}^0, X_{1221}^0, X_{1222}^0, \ldots, X_{12JM}^0, \ldots, X_{1IJM}^0),$$

$$((X_{2111}^0, X_{2112}^0, \ldots, X_{211M}^0, X_{2121}^0, X_{2122}^0, \ldots X_{21JM}^0, X_{2211}^0, X_{2212}^0, \ldots, X_{221M}^0, X_{2221}^0, X_{2222}^0, \ldots, X_{22JM}^0, \ldots, X_{2IJM}^0),$$

$$\ldots,$$

$$((X_{N111}^0, X_{N112}^0, \ldots, X_{N11M}^0, X_{N121}^0, X_{N122}^0, \ldots X_{N1JM}^0, X_{N211}^0, X_{N212}^0, \ldots, X_{N21M}^0, X_{N221}^0, X_{N222}^0, \ldots, X_{N2JM}^0, \ldots, X_{NIJM}^0))$$

where, 0 is an identifier (representing a $0^{th}$ iteration, that is, an initial value of the iteration that has not yet started); n (n is a positive integer) denotes a serial number of the initial material scheduling scheme, and n≤N. Illustratively, $X_{ijm}^0$ denotes an amount of an $m^{th}$ type of rescue materials supplied by a rescue point i to a demand point j, where i, j, and m are all positive integers, i≤I, j≤J, m≤M, and M denotes to a count of types of all rescue materials stored in all rescue points.

In some embodiments, in the initialization stage of the vector corresponding to the initial material scheduling scheme, it is assumed that a total amount of a $k^{th}$ type of rescue materials stored at a rescue point i is $U_{im}$, and an amount of an $m^{th}$ type of rescue materials supplied by the rescue point i to the demand point 1 is randomly initialized to $X_{i1m}^0$, so that an amount of the $m^{th}$ type of rescue materials supplied by the rescue point i to the demand point 2 may be randomly initialized to $X_{i2m}^0$ with a remaining amount $(U_{im} - X_{i1m}^0)$ of the $m^{th}$ type of rescue materials at the rescue point i as an upper boundary (upper critical value), and so on.

In 520, the management platform may obtain at least one candidate material scheduling scheme by iteratively updating the initial material scheduling scheme based on a first preset algorithm.

In some embodiments, operations of iteratively updating of the first preset algorithm may be: obtaining an adjustment amplitude to be updated; obtaining an updated adjustment amplitude by updating the adjustment amplitude to be updated; and obtaining the candidate material scheduling scheme by updating the initial material scheduling scheme based on the updated adjustment amplitude. The adjustment amplitude to be updated in the first iteration may be preset. In addition, the management platform may use the candidate material scheduling scheme as the initial material scheduling scheme of a next iteration, and use the updated adjustment amplitude as the adjustment amplitude to be updated in the next iteration.

In some embodiments, the adjustment amplitude to be updated may include an adjustment amplitude of supply of each type of materials from each rescue point to each demand point in the candidate material scheduling scheme.

In each round of subsequent iteration, the updated adjustment amplitude to be updated may be obtained by updating the adjustment amplitude to be updated of the round. An updated candidate material scheduling scheme may be obtained by updating the candidate material scheduling scheme to be processed based on the updated adjustment amplitude to be updated. The updated candidate material scheduling scheme may be determined as an initial material scheduling scheme of a next round, and the updated adjustment amplitude to be updated may be determined as the adjustment amplitude to be updated of the next round.

In some embodiments, the adjustment amplitude to be updated may be data in the form of a vector. An element of each dimension of the vector may be used as an incremental element to be updated. Updating the adjustment amplitude to be updated may be achieved by updating the incremental element to be updated. The adjustment amplitude to be updated may include a plurality of incremental elements to be updated. There may be a one-to-one correspondence between each element in the vector corresponding to the candidate material scheduling scheme to be processed and each incremental element. An increment element may be used to characterize the adjustment amplitude of supply of a type of material from a rescue point to a demand point in the candidate material scheduling scheme.

In some embodiments, an initial value of the adjustment amplitude to be updated may be characterized by an initialization vector. For example, the vector $V_n^1$ corresponding to an initial adjustment amplitude to be updated corresponding to the $n^{th}$ initial material scheduling scheme may be expressed as:

$$V_n^1 = (v_{n111}^1, v_{n112}^1, \ldots, v_{n11M}^1, v_{n121}^1, v_{n122}^1, \ldots v_{n1JM}^1, v_{n211}^1, v_{n212}^1, \ldots, v_{n21M}^1, v_{n221}^1, v_{n222}^1, \ldots, v_{n2JM}^1, \ldots, v_{nIJM}^1)$$

$V_n^1$ may be used to iteratively update the $n^{th}$ initial material scheduling scheme in the first iteration. For example, the vectors $V_n^1$ corresponding to the initial adjustment amplitudes to be updated corresponding to N initial material scheduling schemes may be expressed as:

$$((v_{1111}^1, v_{1112}^1, \ldots, v_{111M}^1, v_{1121}^1, v_{1122}^1, \ldots v_{11JM}^1, v_{1211}^1, v_{1212}^1, \ldots, v_{121M}^1, v_{1221}^1, v_{1222}^1, \ldots v_{12JM}^1, \ldots, v_{1IJM}^1),$$

$$((v_{2111}^1, v_{2112}^1, \ldots, v_{211M}^1, v_{2121}^1, v_{2122}^1, \ldots v_{21JM}^1, v_{2211}^1, v_{2212}^1, \ldots, v_{221M}^1, v_{2221}^1, v_{2222}^1, \ldots v_{22JM}^1, \ldots, v_{2IJM}^1),$$

$$((v_{N111}^1, v_{N112}^1, \ldots, v_{N11M}^1, v_{N121}^1, v_{N122}^1, \ldots v_{N1JM}^1, v_{N211}^1, v_{N212}^1, \ldots, v_{N21M}^1, v_{N221}^1, v_{N222}^1, \ldots v_{N2JM}^1, \ldots, v_{NIJM}^1)),$$

In some embodiments, the management platform may update the incremental element to be processed based on the current loss of the previous round, and use the updated incremental element as the incremental element to be updated in the next round. The current loss of the previous round may be determined based on an effect difference between the candidate material scheduling scheme obtained in the previous round and the historical optimal candidate material scheduling scheme. The effect difference may be determined based on an evaluation value of the candidate material scheduling scheme. See the related description below for the definition and calculation manner of the evaluation value.

For example, after $(k+1)^{th}$ rounds of iterations, the updated incremental element may be calculated by the following equation:

$$v_{nijm}^{k+1} = \omega v_{nijm}^k + c_1 r_1 (p_{nijm,pbest}^k - X_{nijm}^k) + c_2 r_2 (p_{ijm,gbest}^k - X_{nijm}^k)$$

where, n denotes a serial number of a candidate material scheduling scheme; k denotes a count of rounds of iterations, and k≥0; $v_{nijm}^k$ denotes an incremental element to be processed used by the $n^{th}$ candidate material scheduling scheme in the $(k+1)^{th}$ round of iteration; $X_{nijm}^k$ denotes a $n^{th}$ candidate material scheduling scheme obtained after the k rounds of iterations; ω denotes an inertia weight constant; $c_1$ denotes an individual learning factor; $c_2$ denotes a group learning factor; $r_1$ and $r_2$ are arbitrary values in an interval of [0,1], which are used to increase the randomness of the search.

$p_{nijm,pbest}^k$ denotes an optimal solution of the $n^{th}$ candidate material scheduling scheme in previous iterations after k rounds of iterations. The optimal solution at this time may refer to a material scheduling scheme (i.e., an individual historical optimal solution) corresponding to the evaluation value of the $n^{th}$ candidate material scheduling scheme after k rounds of iterations being a minimum value among the evaluation values calculated in previous iterations.

$p_{ijm,gbest}^k$ denotes an optimal solution of all N candidate material scheduling schemes in previous iterations after k rounds of iterations. At this time, the optimal solution may refer to a material scheduling scheme (i.e., a group historical optimal solution) corresponding to a candidate material scheduling scheme with a minimum evaluation value among the optimal solutions of N candidate material scheduling schemes after k rounds of iterations. A sum of the inertia weight constant, the individual learning factor, the group learning factor, and the random constant may be a system default value, an empirical value, an artificial preset value, or the like, or any combination thereof, set according to the actual demand or any combination thereof.

In some embodiments, each candidate material scheduling scheme to be processed may be updated based on the incremental elements in the updated adjustment amplitude. For example, after the $(k+1)^{th}$ round of iteration, the updated candidate material scheduling scheme may be calculated by the following equation:

$$X_{nijm}^{k+1} = X_{nijm}^k + v_{nijm}^{k+1}.$$

For example, after the first iteration, the updated $n^{th}$ candidate material scheduling scheme may be calculated by the following equation:

$$X_{nijm}^1 = (X_{n111}^1, X_{n112}^1, \ldots, X_{n11M}^1, X_{n121}^1, X_{n122}^1, \ldots X_{n1JM}^1, X_{n211}^1, X_{n121}^1, \ldots, X_{n21M}^1, X_{n221}^1, X_{n222}^1, \ldots, X_{n2JM}^1, \ldots, X_{n1JM}^1) = (X_{n111}^0 + v_{n111}^1, X_{n112}^0 + v_{n112}^1, \ldots, X_{n11M}^0 + v_{n11M}^1, X_{n121}^0 + v_{n121}^1, X_{n122}^0 + v_{n122}^1, \ldots, X_{n1JM}^0 + v_{n1JM}^1, X_{n211}^0 + v_{n211}^1, X_{n212}^0 + v_{n212}^1, \ldots X_{n21M}^0 + v_{n21M}^1, X_{n221}^0 + v_{n221}^1, X_{n222}^0 + v_{n222}^1, \ldots X_{n2JM}^0 + v_{n2JM}^1, \ldots, X_{n1JM}^0 + v_{n1JM}^1)$$

In some embodiments, the adjustment amplitude to be updated and the updated adjustment amplitude may need to make the candidate material scheduling scheme updated based on the adjustment amplitude satisfy a preset constraint condition.

In some embodiments, the constraint condition may include the following three relations:

$$\sum_{i \in I} X_{ijm} \leq q_{jm}, j \leq J, m \leq M \quad (1)$$

$$\sum_{i \in I} \sum_{j \in J} \sum_{m \in M} X_{ijm} = c_{im} \quad (2)$$

$$\forall i \in I, \forall j \in J, \forall m \in M, X_{ijm} \in Z \quad (3)$$

where, $q_{jm}$ denotes demand for an $m^{th}$ type of rescue materials at the demand point j; equation (1) indicates that an amount of various types of rescue materials supplied to each demand point does not exceed its demand; $c_{im}$ denotes a total amount of the $m^{th}$ type of rescue materials stored at the $i^{th}$ rescue point; equation (2) indicates that an amount of materials sent from the rescue point is equal to its available supply, that is, in the case of short supply, all rescue materials should be distributed; Z denotes an integer; equation (3) indicates that an amount of rescue materials supplied by the rescue point to each demand point is a non-negative integer.

In some embodiments, if the updated adjustment amplitude does not satisfy the preset constraint condition, the adjustment amplitude value with a smallest distance from the actually calculated updated adjustment amplitude among the adjustment amplitude values that meet the preset constraint condition may be taken as the updated adjustment amplitude and put into the next iteration. For example, for an updated adjustment amplitude, if $\Sigma_{i \in I} \Sigma_{j \in J} \Sigma_{m \in M} X_{ijm} > c_{im}$ exists in the updated candidate material scheduling scheme, values of items from $X_{i1m}$ to $X_{ijm}$ item may be reduced according to a scale of ($c_{im}/\Sigma_{i \in I} \Sigma_{j \in J} \Sigma_{m \in M} X_{ijm}$), which may be used as the content of the candidate material scheduling scheme.

In 530, the management platform may calculate, based on a second preset algorithm, the evaluation value of each candidate material scheduling scheme of at least one candidate material scheduling scheme.

The second preset algorithm may refer to an algorithm used to calculate the evaluation value of the candidate material scheduling scheme.

In some embodiments, the second preset algorithm may include two objective functions. For example, the evaluation value may be a weighted sum of the result values (f1 and f2) of the two objective functions. In some embodiments, the two objective functions are as follows:

$$f_1 = \max_{j \in J}\left(r_j \mu_j \left(1 - \left(\sum_{i \in I} \sum_{m \in M} X_{ijm}\right) / \left(\sum_{m \in M} q_{jm}\right)\right)\right) \quad (4)$$

$$f_2 = \sum_{i \in I} \sum_{j \in J} d_{ij} s_{ij} \quad (5)$$

where, max denotes a sign of a maximum value; $r_j$ denotes a water accumulation risk at a demand point j; $u_j$ denotes a priority coefficient of the demand point j; $d_{ij}$ denotes a count of deliveries of rescue materials from the rescue point i to the demand point j; $s_{ij}$ denotes a driving distance of the transportation vehicles used when delivering rescue materials from the rescue point i to the demand point j. In equation (4), $(\Sigma_{i \in I} \Sigma_{m \in M} X_{ijm})/(\Sigma_{m \in M} q_{jm})$ denotes a satisfaction degree of each demand point j of J demand points. Satisfaction degree may refer to a proportion of rescue materials obtained at a demand point to a total demand of materials. For example, if the amount of first, second, and third types of rescue materials obtained by the demand point j is $X_{j1}$, $X_{j2}$, and $X_{j2}$ respectively, and demand for the first, second, and third types of rescue materials may be $q_{j1}$, $q_{j2}$, and $q_{j3}$ respectively, the satisfaction degree of the demand point $j=(X_{j1}+X_{j2}+X_{j2})/(q_{j1}+q_{j2}+q_{j3})$. Accordingly, $(1-(\Sigma_{i \in I} \Sigma_{m \in M} X_{ijm})/(\Sigma_{m \in M} q_{jm}))$ denotes a non-satisfaction degree of each demand point j of J demand points, and $(r_j \mu_j (1-(\Sigma_{i \in I} \Sigma_{m \in M} X_{ijm})/(\Sigma_{m \in M} q_{jm})))$ denotes the non-satisfaction degree with reference to the water accumulation risk and the priority coefficient at the demand point. In equation (5), $\Sigma_{i \in I} \Sigma_{j \in J} d_{ij} s_{ij}$ denotes the total transportation cost of transporting rescue materials from each rescue point to each demand point.

An evaluation value may be calculated based on the following equation:

$$p = h_1 f_1 + h_2 f_2$$

where, p denotes the evaluation value; $h_1$ and $h_2$ denote weight values of $f_1$ and $f_2$, respectively. Values of $h_1$ and $h_2$ may be preset manually.

In some embodiments, the evaluation value of the candidate material scheduling scheme may be related to a road water accumulation risk in the target area. In some embodiments, the road water accumulation risk may be determined based on a water accumulation risk prediction model. The water accumulation risk prediction model may be a machine learning model, which may be the same as the water accumulation risk prediction model in FIG. 2. See the corresponding descriptions of FIG. 2 for details.

In 540, the management platform may perform a plurality of rounds of iterations on the candidate material scheduling scheme until an iteration completion condition is met.

In some embodiments, the iteration completion condition may be that when more than one candidate material scheduling scheme converges to one candidate material scheduling scheme, the evaluation value may be smaller than an evaluation value threshold. The evaluation value threshold can be manually preset.

In yet other embodiments, the iteration completion condition may be that a count of iterations reaches a preset number.

Finally, the management platform may use a candidate material scheduling scheme obtained when the iteration completion condition is met as a final material scheduling scheme.

In some embodiments of the present disclosure, a plurality of candidate material scheduling schemes may be continuously updated and candidate material scheduling schemes may be continuously optimized in an iteration way, thereby determining the final material scheduling scheme that satisfies the requirements of the evaluation value, so that existing rescue materials can satisfy the material demand of the target area to a greatest extent while saving transportation cost.

Some embodiments of the present disclosure provide a comprehensive analysis of the material demand roads or intersections and the storage points of rescue materials in the target area to satisfy the material demand of each material demand point in the target area to a greatest extent.

It should be noted that the above description regarding the process 500 is merely provided for the purposes of illustration, and not intended to limit the scope of the present disclosure. For those skilled in the art, multiple variations and modifications to the process 500 may be made under the teachings of the present disclosure. However, these modifications and changes are still within the scope of the present disclosure. For example, adjust the weight value calculated by the evaluation value.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for predicting a water accumulation risk in a smart city implemented based on a management platform of an Internet of Things (IoT) system for predicting a water accumulation in a smart city, wherein the IoT system is configured as a part of a processing device or realized by the processing device, the IoT system further comprising a user platform, a service platform, a sensor network platform, and an object platform, wherein the management platform includes a general database and a plurality of management sub-platforms, and the sensor network platform includes a plurality of sensor network sub-platforms; the sensor network platform is connected with the management platform and the object platform to realize functions of perceptual information sensor communication and control information sensor communication; the method comprising:

obtaining area information of a target area based on the object platform and transmitting the area information to a management sub-platform through a sensor network sub-platform corresponding to the management sub-platform, and uploading the area information to the general database of the management platform by the management sub-platform;

predicting, based on the area information, a water accumulation risk in the target area using the management platform;

determining, based on the water accumulation risk, an adjustment scheme corresponding to the target area using the management platform, including:

in response to the water accumulation risk satisfying a first preset condition, determining, based on processing of the area information performed by a joint scheduling model, a first joint regulation scheme corresponding to the target area, the first joint regulation scheme including a joint scheduling scheme of the regulation and storage facilities in the target area, the joint scheduling model being a neural network model;

wherein the joint scheduling model is obtained through a training process including:
  inputting, by the management platform, a plurality of first training samples with first labels into an initial joint scheduling model, wherein the first training samples include historical area information of a historical target area, and the first labels include a historical joint regulation scheme corresponding to the historical area information;
  constructing a first loss function based on the first labels and outputs of the initial joint scheduling model, and
  iteratively updating parameters of the initial joint scheduling model based on the first loss function; and
  completing training of the initial joint scheduling model until the first loss function satisfies a first preset training condition, and obtaining the joint scheduling model; wherein the first preset training condition includes that the first loss function converges or a count of iterations reaches a first threshold; and executing, by the general database of the management platform, an adjustment instruction corresponding to the adjustment scheme and transmitting the adjustment scheme to the user platform through the service platform.

2. The method of claim 1, wherein the area information includes road network information, precipitation information, drainage capacity information, and historical water accumulation information in the target area; and
  the predicting, based on the area information, a water accumulation risk in the target area includes:
    determining, based on processing on the area information performed by a water accumulation risk prediction model, a road water accumulation risk of each road in the target area during a target time period, the water accumulation risk prediction model being a neural network model;
    wherein the water accumulation risk prediction model is obtained through a training process including:
      inputting a plurality of second training samples with second labels into an initial water accumulation risk prediction model, wherein the second training samples include area information of a sample area during a first sample time period, and the second labels include an actual road water accumulation risk of each road in the sample area during a second sample time period; and the first sample time period is earlier than the second sample time period;
      constructing a second loss function based on the second labels and outputs of the initial water accumulation risk prediction model; and
      iteratively updating parameters of the initial water accumulation risk prediction model based on the second loss function;
      completing training of the initial water accumulation risk prediction model until the second loss function satisfies a second preset training condition, and obtaining the water accumulation risk prediction model; wherein the second preset training condition includes that the second loss function converges, a value of the second loss function is smaller than a preset value, or a count of training iterations reaches a second threshold.

3. The method of claim 1, wherein the area information includes first information and second information of the target area, the first information including road network information, precipitation information, drainage capacity information, and historical water accumulation information, and the second information including deployment information of regulation and storage facilities, water storage capacity information of the regulation and storage facilities, drainage capacity information of the regulation and storage facilities, and on-off information of the regulation and storage facilities in the target area.

4. The method of claim 1, wherein the area information includes third information and fourth information of the target area, the third information including division information of a demand point, demand information of a demand point, a water accumulation risk of a demand point, and a priority coefficient of a demand point of the target area, and the fourth information including division information of a rescue point, material information of a rescue point, and historical rescue information of a rescue point of the target area; and
  the determining, based on the water accumulation risk, an adjustment scheme corresponding to the target area includes:
    in response to the water accumulation risk satisfying a second preset condition, determining, based on the area information, a material scheduling scheme corresponding to the target area.

5. The method of claim 4, wherein the determining, based on the area information, a material scheduling scheme corresponding to the target area includes:
  obtaining an initial material scheduling scheme, the initial material scheduling scheme including initial supply of rescue materials supplied by the each rescue point to the each demand point;
  obtaining at least one candidate material scheduling scheme by iteratively updating the initial material scheduling scheme based on a first preset algorithm;
  calculating, based on a second preset algorithm, an evaluation value of each of the at least one candidate material scheduling scheme; and
  performing a plurality rounds of iterations on the candidate material scheduling scheme until an iteration completion condition is met.

6. The method of claim 5, wherein the evaluation value of the candidate material scheduling scheme is related to a road water accumulation risk in the target area, the road water accumulation risk is determined based on a water accumulation risk prediction model, and the water accumulation risk prediction model is a neural network model.

7. An Internet of things (IoT) system for predicting a water accumulation risk in a smart city, wherein the IoT system is configured as a part of a processing device or realized by the processing device, the IoT system comprising: a management platform, a user platform, a service platform, a sensor network platform, and an object platform, wherein the management platform includes a general database and a plurality of management sub-platforms, and the sensor network platform includes a plurality of sensor network sub-platforms; the sensor network platform is connected with the management platform and the object platform to realize functions of perceptual information sensor communication and control information sensor communication; wherein
- area information of a target area is obtained based on the object platform, transmitted to a management sub-platform by a sensor network sub-platform corresponding to the management sub-platform, and uploaded to the general database of the management platform by the management sub-platform; and
- the management platform is configured to:
  - predict, based on the area information, a water accumulation risk in the target area;
  - determine, based on the water accumulation risk, an adjustment scheme corresponding to the target area, wherein to determine the adjustment scheme corresponding to the target area, the management platform is further configured to:
    - in response to the water accumulation risk satisfying a first preset condition, determining, based on processing of the area information performed by a joint scheduling model, a first joint regulation scheme corresponding to the target area, the first joint regulation scheme including a joint scheduling scheme of the regulation and storage facilities in the target area; the joint scheduling model being a neural network model; wherein
  - the joint scheduling model is obtained through a training process including:
    - inputting, by the management platform, a plurality of first training samples with first labels into an initial joint scheduling model, wherein the first training samples include historical area information of a historical target area, and the first labels include a historical joint regulation scheme corresponding to the historical area information;
    - constructing a first loss function by the first labels and outputs of the initial joint scheduling model; and
    - iteratively updating parameters of the initial joint scheduling model based on the first loss function;
    - completing training of the initial joint scheduling model until the first loss function satisfies a first preset training condition, and obtaining the joint scheduling model; wherein the first preset training condition includes that the first loss function converges or a count of iterations reaches a first threshold; and
  - the general database of the management platform is configured to execute an adjustment instruction corresponding to the adjustment scheme and transmit the adjustment scheme to the user platform through the service platform.

8. The system of claim 7, wherein the area information includes road network information, precipitation information, drainage capacity information, and historical water accumulation information in the target area; and
the management platform is further configured to:
- determine, based on processing on the area information performed by a water accumulation risk prediction model, a road water accumulation risk of each road in the target area during a target time period, the water accumulation risk prediction model being a neural network model;
- wherein the water accumulation risk prediction model is obtained through a training process including:
  - inputting a plurality of second training samples with second labels into an initial water accumulation risk prediction model, wherein the second training samples include area information of a sample area during a first sample time period, and the second labels include an actual road water accumulation risk of each road in the sample area during a second sample time period; and the first sample time period is earlier than the second sample time period;
  - constructing a second loss function based on the second labels and outputs of the initial water accumulation risk prediction model;
  - iteratively updating parameters of the initial water accumulation risk prediction model based on the second loss function; and
  - completing training of the initial water accumulation risk prediction model until the second loss function satisfies a second preset training condition, obtaining the water accumulation risk prediction model; wherein the second preset training condition includes that the second loss function converges, a value of the second loss function is smaller than a preset value, or a count of training iterations reaching a second threshold.

9. The method of claim 1, wherein the area information includes first information and second information of the target area, the first information including road network information, precipitation information, drainage capacity information, and historical water accumulation information, and the second information including deployment information of regulation and storage facilities, water storage capacity information of the regulation and storage facilities, drainage capacity information of the regulation and storage facilities, and on-off information of the regulation and storage facilities in the target area.

10. The system of claim 7, wherein the area information includes third information and fourth information of the target area, the third information including division information of a demand point, demand information of a demand point, a water accumulation risk of a demand point, and a priority coefficient of a demand point of the target area, and the fourth information including division information of a rescue point, material information of a rescue point, and historical rescue information of a rescue point of the target area; and
the management platform is further configured to:
- in response to the water accumulation risk satisfying a second preset condition, determine, based on the area information, a material scheduling scheme corresponding to the target area.

11. The system of claim 10, wherein the management platform is further configured to:
- obtain an initial material scheduling scheme, the initial material scheduling scheme including initial supply of rescue materials supplied by the each rescue point to the each demand point;
- obtain at least one candidate material scheduling scheme by iteratively updating the initial material scheduling scheme based on a first preset algorithm;
- calculate, based on a second preset algorithm, an evaluation value of each of the at least one candidate material scheduling scheme; and
- perform a plurality rounds of iterations on the candidate material scheduling scheme until an iteration completion condition is met.

12. The system of claim 11, wherein the evaluation value of the candidate material scheduling scheme is related to a road water accumulation risk in the target area, the road water accumulation risk is determined based on a water accumulation risk prediction model, and the water accumulation risk prediction model is a neural network model.

13. A non-transitory computer-readable storage medium storing computer instructions, wherein when the computer instructions are executed by a processor, the method for predicting a water accumulation risk in a smart city of claim 1 is implemented.

14. The method of claim 4, wherein the obtaining at least one candidate material scheduling scheme by iteratively updating the initial material scheduling scheme based on a first preset algorithm includes:
   obtaining an adjustment amplitude to be updated;
   updating the adjustment amplitude to be updated to obtain an updated adjustment amplitude;
   updating the initial material scheduling scheme based on the updated adjustment amplitude to obtain the candidate material scheduling scheme;
   using the candidate material scheduling scheme as the initial material scheduling scheme of a next iteration, and using the updated adjustment amplitude as the adjustment amplitude to be updated in the next iteration;
   wherein the adjustment amplitude to be updated in the first iteration is preset; and
   the adjustment amplitude to be updated and the updated adjustment amplitude need to make the candidate material scheduling scheme updated based on the updated adjustment amplitude satisfying a preset constraint condition.

15. The method of claim 14, further comprising:
   in response to the updated adjustment amplitude not satisfying the preset constraint condition, taking an adjustment amplitude value with a smallest distance from an actual calculated updated adjustment amplitude among adjustment amplitude values that meet the preset constraint condition as the updated adjustment amplitude and putting the adjustment amplitude value into the next iteration.

16. The system of claim 10, wherein the management platform is further configured to:
   obtain an adjustment amplitude to be updated;
   update the adjustment amplitude to be updated to obtain an updated adjustment amplitude;
   update the initial material scheduling scheme based on the updated adjustment amplitude to obtain the candidate material scheduling scheme;
   use the candidate material scheduling scheme as the initial material scheduling scheme of a next iteration, and using the updated adjustment amplitude as the adjustment amplitude to be updated in the next iteration;
   wherein the adjustment amplitude to be updated in the first iteration is preset; and
   the adjustment amplitude to be updated and the updated adjustment amplitude need to make the candidate material scheduling scheme updated based on the updated adjustment amplitude satisfying a preset constraint condition.

17. The system of claim 16, further comprising:
   in response to the updated adjustment amplitude not satisfying the preset constraint condition, taking an adjustment amplitude value with a smallest distance from an actual calculated updated adjustment amplitude among adjustment amplitude values that meet the preset constraint condition as the updated adjustment amplitude and putting the adjustment amplitude value into the next iteration.

* * * * *